US012070781B2

(12) United States Patent
Heymann et al.

(10) Patent No.: US 12,070,781 B2
(45) Date of Patent: Aug. 27, 2024

(54) AUTOMATIC EMITTER POINT CLEANERS

(71) Applicant: Illinois Tool Works Inc., Glenview, IL (US)

(72) Inventors: Steven Bernard Heymann, Los Gatos, CA (US); Aleksey Klochkov, San Francisco, CA (US); Juan Guerrero, Berkeley, CA (US); Edward Anthony Oldynski, Martinez, CA (US); Gee Kuen Chong, Union City, CA (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 18/151,878

(22) Filed: Jan. 9, 2023

(65) Prior Publication Data

US 2023/0173549 A1 Jun. 8, 2023

Related U.S. Application Data

(63) Continuation of application No. 17/009,347, filed on Sep. 1, 2020, now Pat. No. 11,548,039, which is a continuation of application No. 15/928,261, filed on Mar. 22, 2018, now Pat. No. 10,758,947.

(60) Provisional application No. 62/476,144, filed on Mar. 24, 2017.

(51) Int. Cl.

| | |
|---|---|
| ***B08B 1/32*** | (2024.01) |
| ***B08B 1/12*** | (2024.01) |
| ***B08B 5/02*** | (2006.01) |
| ***H01T 19/04*** | (2006.01) |
| ***H01T 23/00*** | (2006.01) |

(52) U.S. Cl.

CPC .................. *B08B 1/32* (2024.01); *B08B 1/12* (2024.01); *B08B 5/02* (2013.01); *H01T 19/04* (2013.01); *H01T 23/00* (2013.01)

(58) Field of Classification Search

CPC .. B08B 1/04; B08B 1/002; B08B 5/02; H01T 19/04; H01T 23/00; H05F 3/04; H05F 3/06

See application file for complete search history.

(56) References Cited

U.S. PATENT DOCUMENTS

| | | | |
|---|---|---|---|
| 5,493,383 | A | 2/1996 | Pozniakas |
| 5,768,087 | A | 6/1998 | Vernitskiy |
| 2010/0188793 | A1 | 7/2010 | Uchida |

FOREIGN PATENT DOCUMENTS

| | | |
|---|---|---|
| CN | 105849993 A | 8/2016 |
| KR | 20150072063 | 6/2015 |
| TW | 201210707 | 3/2012 |

OTHER PUBLICATIONS

Int'l Search Report and Written Opinion Appln No. PCT/US2018/023920 (14 pgs).
Taiwanese Search Report Appln No. 111117615 dated Nov. 7, 2022.

*Primary Examiner* — David Redding
(74) *Attorney, Agent, or Firm* — McAndrews, Held & Malloy, Ltd.

(57) ABSTRACT

Automatic emitter point cleaners are disclosed. An automatic emitter point cleaning system includes: a fan configured to direct a stream of air through an air path; a point emitter configured to produce at least one of positive ions or negative ions within or proximate to the air path; a brush; a first gear coupled to the brush and configured to move the brush into contact with the point emitter; a second gear to engage the first gear; and a motor to actuate the second gear such that the second gear actuates the first gear to move the brush past the point emitter.

19 Claims, 6 Drawing Sheets

AUTOMATIC EMITTER POINT CLEANERS

This application is a continuation of U.S. patent application Ser. No. 17/009,347, filed Sep. 10, 2020, now U.S. Pat. No. 11,548,039, issued Jan. 10, 2023, which is a continuation of U.S. patent application Ser. No. 15/928,261, filed Mar. 22, 2018, now U.S. Pat. No. 10,758,947, issued Sep. 1, 2020, which claims priority to U.S. provisional application 62/476,144, filed Mar. 24, 2017.

BACKGROUND

This disclosure relates generally to ionizers and, more particularly, to automatic emitter point cleaners.

Ionizing devices that function as static eliminators or neutralizers may produce both polarities of ions that combine with and neutralize oppositely charged surfaces. Such devices are useful for maintaining electrostatically neutral conditions usually associated with the manufacture of electronic devices, especially semiconductors. Because these ionizers use discharge electrodes that produce an electric field, they tend to accumulate foreign particles at their emitter points or edges. This particle accumulation can cause an excess emission of ions of one polarity or the other, i.e., ion imbalance, whereby the area at which both polarities of ions are directed tends to become charged rather than electrostatically neutral.

SUMMARY

Automatic emitter point cleaners are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
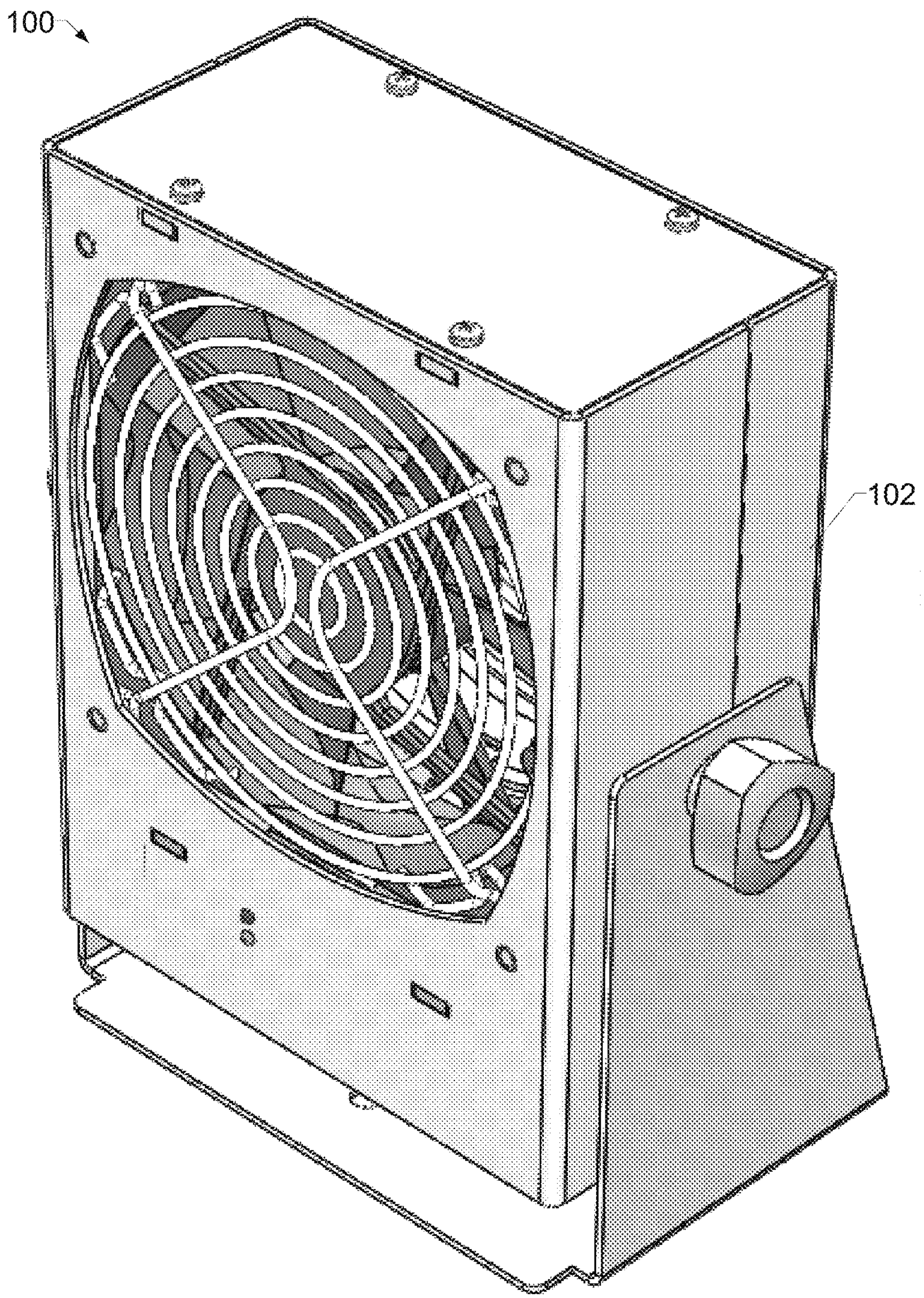
FIG. 1 is a view of an example DC corona ionizer, in accordance with aspects of this disclosure.

Conventional emitter point cleaning devices for ionizing blowers are connected to an axis of rotation of a fan, and the fan speed must be reduced from the speed during operation to enable emitter cleaning. As a result, conventional emitter point cleaning devices require a reduction in performance, or even disabling, of the ionizing blower to perform cleaning of the emitter points. A reduction in performance or disabling of the ionizing blower may provide a window in which charge buildup is more likely to damage sensitive devices.

Disclosed example systems enable emitter point cleaning for ionizing devices such that the ionizing device can continue to function (e.g., clean the air, neutralize charge, etc.) during cleaning. Disclosed example systems include a brush, a first ring coupled to the brush, a second ring to engage the first ring, and a motor to actuate the second ring such that the second ring actuates the first ring.

Disclosed example automatic emitter point cleaning systems include: a fan configured to direct a stream of air through an air path; a point emitter configured to produce at least one of positive ions or negative ions within or proximate to the air path; a brush; a first gear coupled to the brush and configured to move the brush into contact with the point emitter; a second gear to engage the first gear; and a motor to actuate the second gear such that the second gear actuates the first gear to move the brush past the point emitter.

Some example systems further include a plurality of point emitters, in which the first gear is configured to move the brush into contact ones of the plurality of point emitters. In some examples, the plurality of point emitters are arranged in a substantially circular or polygonal arrangement. In some examples, the plurality of point emitters are arranged around an inner circumference of the first gear. In some examples, wherein the substantially circular or polygonal arrangement is substantially coaxial with the fan.

Some example systems further include a position detector configured to determine when the brush is in a predetermined position. In some examples, the motor is bidirectional. Some example systems further include a housing configured to couple the first gear, the second gear, the motor, and the fan. In some examples, the point emitter is configured to generate bipolar ions. In some examples, the motor is configured to actuate the second gear based on at least one of a determination by processing circuitry or an external signal. In some examples, the motor is configured to actuate the second gear to clear the point emitter while the plurality of point emitters are generating the positive ions or the negative ions. In some example systems, the second gear and the motor are outside of the air path.

Disclosed example automatic emitter point cleaning systems include a fan configured to direct a stream of air through an air path; a plurality of point emitters arranged in a circular or polygonal arrangement and configured to produce at least one of positive ions or negative ions within or proximate to the air path; a brush configured to physically clean the plurality of point emitters; and a motor configured to cause the brush to clean the plurality of point emitters via a gearing system having one or more gears.

In some examples, the plurality of point emitters are arranged around an inner circumference of a first gear of the gearing system. In some examples, the substantially circular or polygonal arrangement is substantially coaxial with the fan. In some examples, the motor is configured to drive the gearing system to move the brush in either direction.

Some example systems further include a housing configured to couple the gearing system, the plurality of point emitters, the motor, and the fan. In some examples, the point emitter is configured to generate bipolar ions. In some examples, the gearing system comprises three or more gears. In some examples, the motor is configured to cause the brush to clean the plurality of point emitters while the plurality of point emitters are generating the positive ions or the negative ions.

FIG. 1 is a view of an example DC corona ionizer 100. The ionizer 100 includes a housing 102 that holds a fan configured to blow a stream of air through an air path. As described in more detail below, the ionizer 100 includes ion emitters that emit positive and/or negative ions, and the fan blows the stream of air over the ion emitters, which results in a neutralization of electric charge that may be present in the air stream.

While examples disclosed below are described with reference to a DC corona ionizer, aspects of this disclosure may additionally or alternatively be used with an AC corona ionizer and/or a combination AC/DC corona ionizer.

Figure 2:
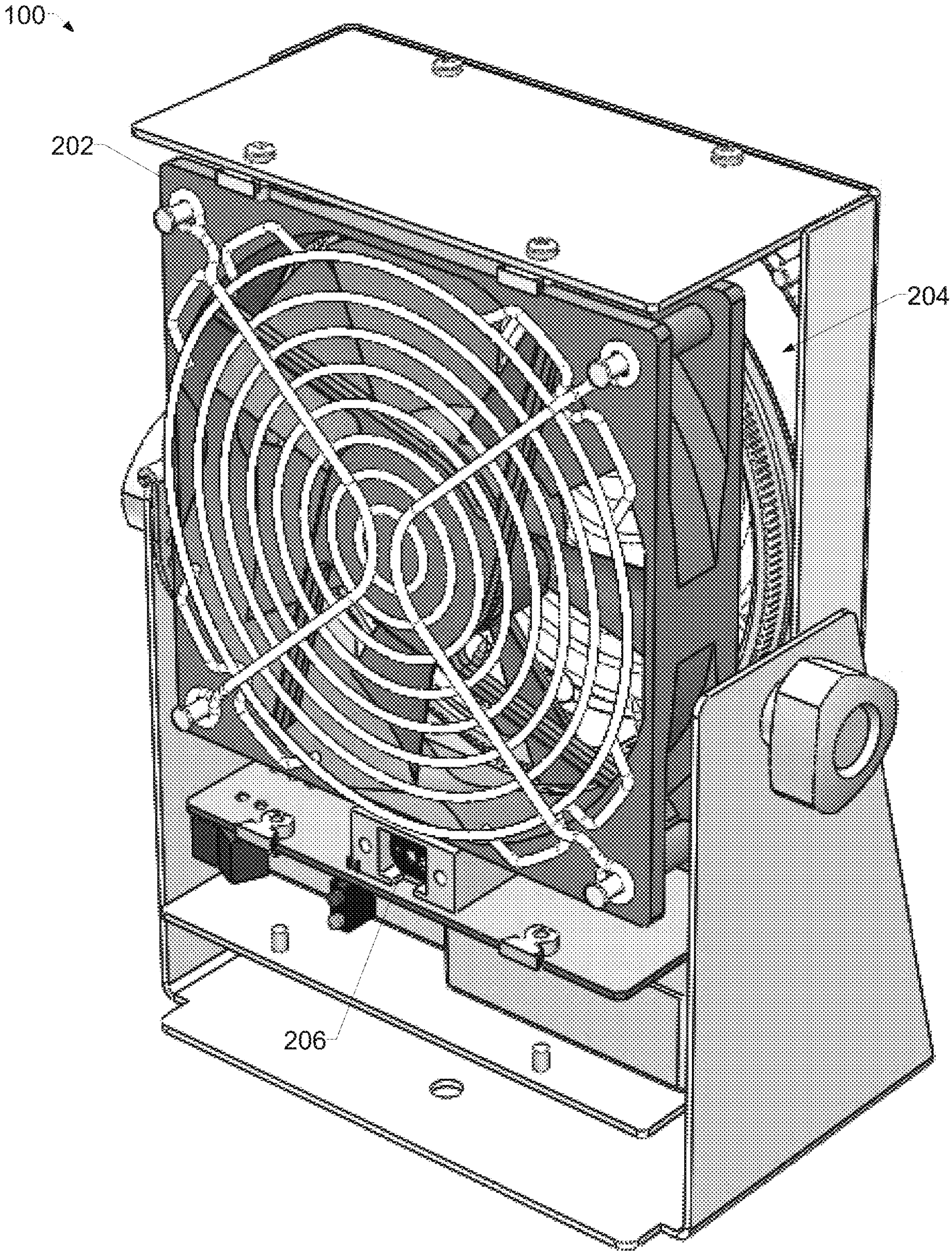
FIG. 2 is a view of an interior of the example DC corona ionizer of FIG. 1.

FIG. 2 is a view of an interior of the example DC corona ionizer 100 of FIG. 1. FIG. 2 illustrates the example fan 202 and an automatic emitter point cleaner 204. The automatic emitter point cleaner 204 includes a unidirectional or bidirectional DC motor 206. The DC motor 206 may receive a drive signal and/or DC current to actuate the automatic emitter point cleaner 204. The example fan 202 includes a housing 208 that may be used to mount the fan 202 to the housing 102 and/or to attach the automatic emitter point cleaner 204 to the fan 202.

The example DC motor 206 may be a brushless DC motor or any other type of AC or DC motor.

Figure 3:
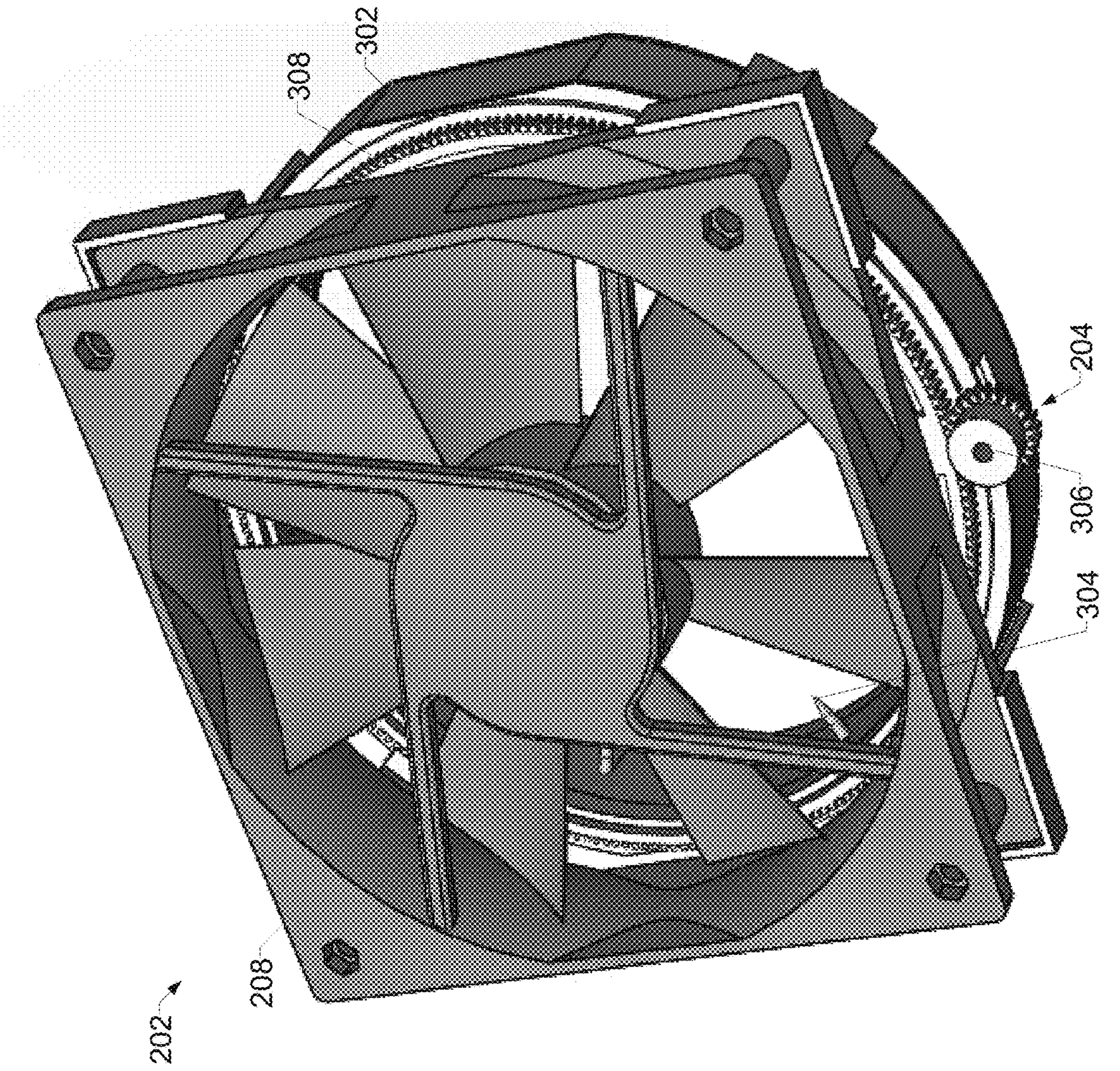
FIG. 3 is a view of the example fan of the DC corona ionizer attached to an automatic emitter point cleaner, in accordance with aspects of this disclosure.

FIG. 3 is a view of the example fan 202 of the DC corona ionizer 100 attached to automatic emitter point cleaner 204. The example ionizer 100 includes an emitter frame 302 that holds ion emitters 304 in place around an inner circumference of the emitter frame 302, within the air path of the fan 202.

The example automatic emitter point cleaner 204 includes a pinion gear 306 and a spur gear 308. The spur gear 308 holds an emitter point brush. The pinion gear 306 is driven by the DC motor 206 of FIG. 2, and interfaces with the spur gear 308 to drive the spur gear 308. The example spur gear 308 and the emitter frame 302 are attached to the housing 208 of the fan 202 such that the spur gear 308 is substantially coaxial with the fan and holds the emitter point brush in a same plane as the ion emitters 304.

Figure 4:
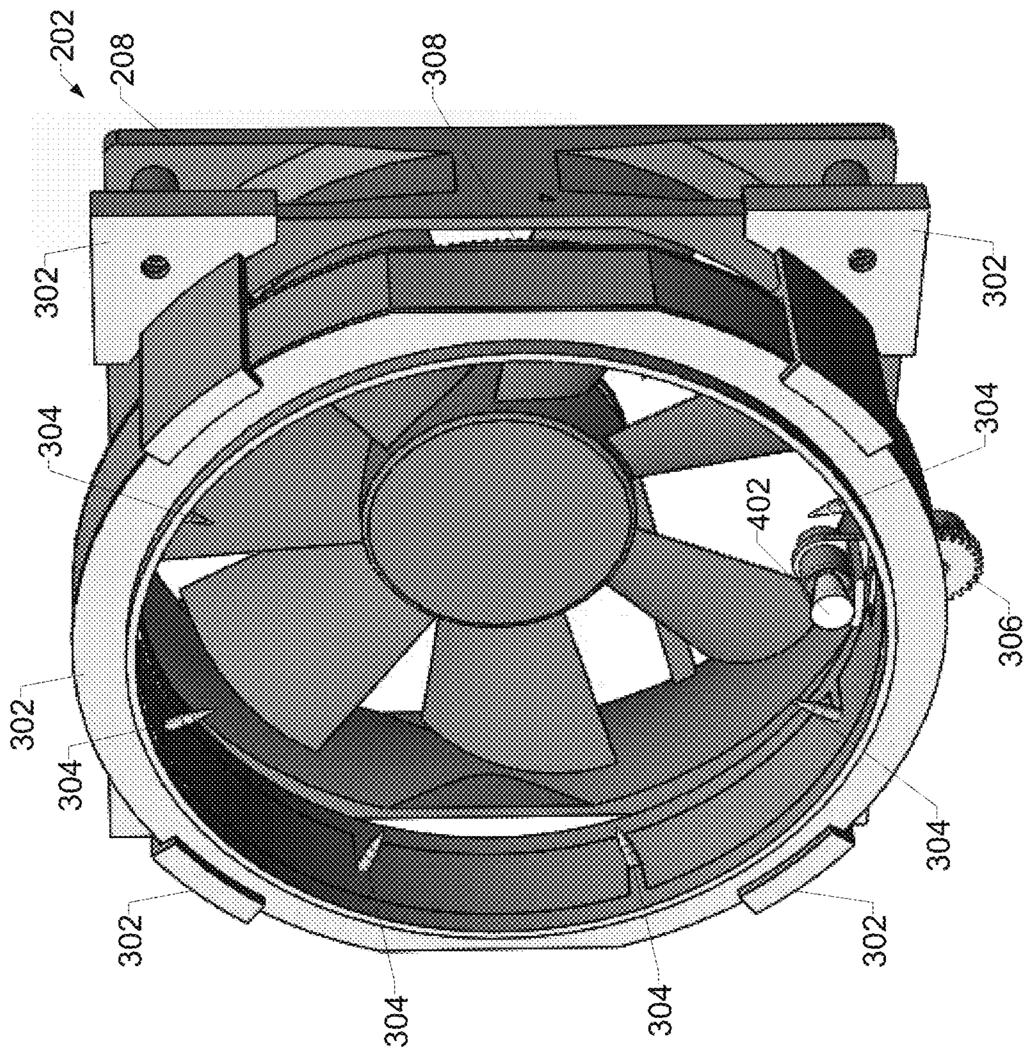
FIG. 4 is another view of the example fan and the automatic emitter point cleaner of FIG. 3.

FIG. 4 is another view of the example fan 202 and the automatic emitter point cleaner 204 of FIG. 3. FIG. 4 shows the fan 202, the housing 208, the example emitter frame 302, the emitters 304, the pinion gear 306, and the spur gear 308. An emitter point brush 402 is visible in FIG. 4.

Figure 5:
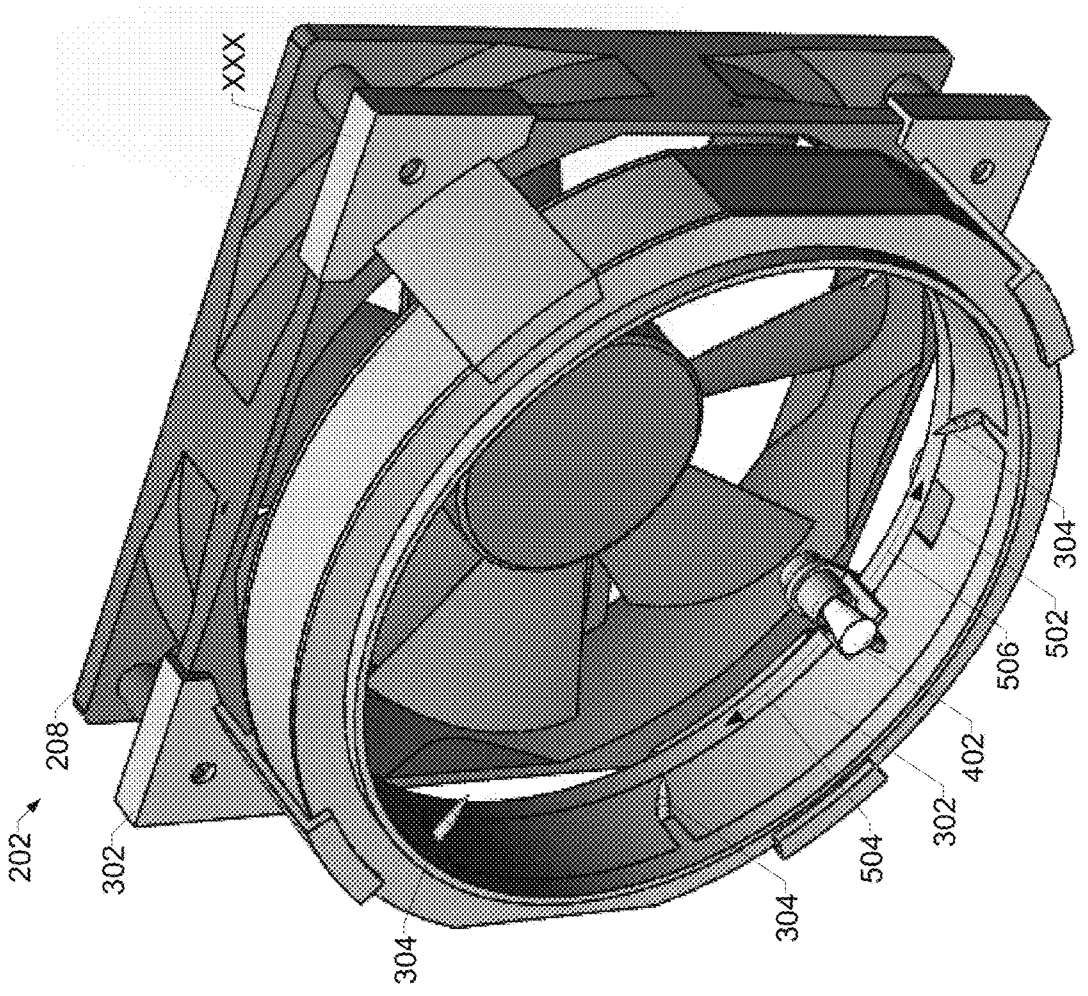
FIG. 5 is another view of the example fan and the automatic emitter point cleaner of FIG. 3.

FIG. 5 is another view of the example fan 202 and the automatic emitter point cleaner 204 of FIG. 3. In the view of FIG. 4, the emitter point brush 402 is shown in a known default, or home, position. The automatic emitter point cleaner 204 may include a position detector to identify (e.g., generate a signal) when the emitter point brush 402 is in the default position. The example emitter frame 302 includes a detection window 502, through which a visual-type position detector (e.g., a laser detector) may identify when the emitter point brush 402 is proximate the detection window 502. Other position detectors include, for example, Hall effect sensors, switches, and/or any other type of proximity sensor and/or circuitry.

As illustrated in FIGS. 4 and 5, the spur gear 308 and the brush 402 may make complete and/or partial rotations around the inner circumference of the emitter frame 302 in one or both directions 504, 506. For example, the motor 206 of FIG. 2 drives the pinion gear 306 in one or both directions, which in turn causes rotation of the spur gear 308 and movement of the brush 402 around the inner circumference of the emitter frame 302. The example ionizer 100 may continue to run the fan 202 and generate ions via the emitters 304 while the brush 402 moves and cleans the emitters 304.

Figure 6:
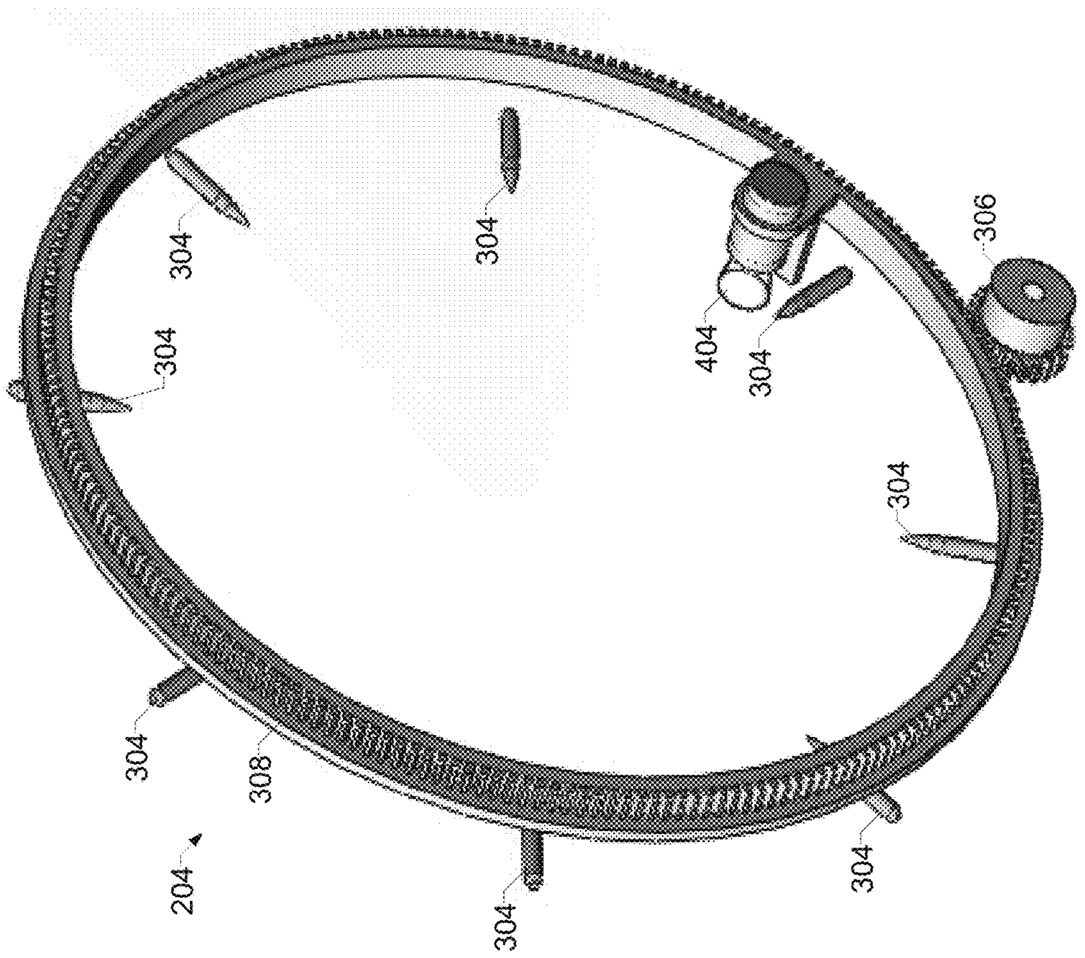
FIG. 6 is a view of example implementation of the automatic emitter point cleaner of FIGS. 3-5.

FIG. 6 is a view of example implementation of the automatic emitter point cleaner 204 of FIGS. 3-5. The structure of the example pinion gear 306, the example spur gear 308, and the example emitter point brush 402 are illustrated in FIG. 6.

The example automatic emitter point cleaner 204 of FIGS. 2-6 is motor driven (i.e., not centrifugal as in conventional systems). As a result, the automatic emitter point cleaner 204 may be activated to perform cleaning independently of the fan 202. For example, the automatic emitter point cleaner 204 may be activated with an internal timer (e.g., in a microprocessor controlling the fan 202 and/or emission of ions from the emitters 304) and/or from an external signal via an I/O connector.

While the examples of FIGS. 2-6 illustrate a two-gear implementation, other examples include three or more gears and/or a single-gear implementation in which the gear holding the emitter point brush is driven directly by a motor.

The example automatic emitter point cleaner 204 can be actuated in a single direction (e.g., clockwise or counterclockwise) and/or can be operated in both clockwise and counterclockwise to clean the emitters 304 in both directions.

The example automatic emitter point cleaner 204 may clean with any combination of full rotations and/or partial rotations. For example, a processor controlling the motor 206 may execute application-specific cleaning procedures including full rotations and/or partial rotations to perform particular types of cleaning.

The example automatic emitter point cleaner 204 may include position sensing to monitor the location of the emitter point brush 404. For example, the automatic emitter point cleaner 204 may determine when the brush assembly is in a default position at a start and/or finish of the cleaning process. In other examples, a processor controlling the motor 206 may track a location of the emitter point brush 404 along the inner circumference of the emitter frame 302 using a sensor (e.g., a gyroscope, a travel sensor coupled to the pinion gear 306 or the spur gear 308) and/or by tracking the speed and direction of operation of the motor 206.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, blocks and/or components of disclosed examples may be combined, divided, re-arranged, and/or otherwise modified. Therefore, it is intended that the present method and/or system not be limited to the particular implementations disclosed, but that the present method and/or system will include all implementations falling within the scope of the appended claims, both literally and under the doctrine of equivalents.

What is claimed is:

1. An automatic emitter point cleaning system, comprising:

an emitter point configured to produce at least one of positive ions or negative ions within or proximate to an air path;

an emitter frame configured to hold the emitter point in or proximate to the air path;

a brush;

a motor coupled to the brush to actuate the brush to move past the emitter point;

a sensor configured to detect when the brush is in a predetermined position with respect to the emitter frame; and a processor configured to control the motor to execute a cleaning process by moving the brush around the emitter frame and to determine the cleaning process is finished when the brush is in the predetermined position.

2. The automatic emitter point cleaning system as defined in claim 1, wherein the processor is configured to control the motor to actuate the brush based on at least one of a determination by the processor or an external signal.

3. The automatic emitter point cleaning system as defined in claim 1, further comprising a plurality of emitter points in the same axial plane as the emitter point and the brush, the emitter frame configured to hold the plurality of emitter points radially inward from the emitter frame and into the air path, the motor configured to move the brush into contact with each of the plurality of emitter points.

4. The automatic emitter point cleaning system as defined in claim 3, wherein the plurality of emitter points are arranged in a substantially circular or polygonal arrangement.

5. The automatic emitter point cleaning system as defined in claim 4, further comprising:

a first gear coupled to the brush, configured to hold the brush in a same axial plane as the emitter point, and configured to move the brush into contact with the emitter point; and a second gear coupled between the motor and the first gear to actuate the first gear in response to actuation by the motor, wherein the plurality of emitter points are arranged around or adjacent to an inner circumference of the first gear.

6. The automatic emitter point cleaning system as defined in claim 4, wherein the substantially circular or polygonal arrangement is substantially coaxial with the fan.

7. The automatic emitter point cleaning system as defined in claim 3, wherein the motor is configured to actuate the brush to clean the emitter point while the plurality of emitter points are generating positive ions or negative ions.

8. The automatic emitter point cleaning system as defined in claim 1, wherein the emitter frame is configured to hold the emitter point radially inward from the emitter frame.

9. The automatic emitter point cleaning system as defined in claim 1, further comprising:

a first gear coupled to the brush, configured to hold the brush in a same axial plane as the emitter point, and configured to move the brush into contact with the emitter point; and a second gear coupled between the motor and the first gear to actuate the first gear in response to actuation by the motor.

10. The automatic emitter point cleaning system as defined in claim 9, wherein the second gear and the motor are outside of the air path.

11. The automatic emitter point cleaning system as defined in claim 1, wherein the motor is a bidirectional motor configured to move the brush in either direction.

12. The automatic emitter point cleaning system as defined in claim 1, further comprising a fan configured to direct a stream of air through the air path.

13. An automatic emitter point cleaning system, comprising:

a fan configured to direct a stream of air through an air path;

an emitter point configured to produce at least one of positive ions or negative ions within the air path;

an emitter frame configured to hold the emitter point in the air path;

a brush positioned in a same plane as the emitter point and configured to physically clean the emitter point;

a motor configured to cause the brush to clean the emitter point;

a sensor configured to detect when the brush is in a predetermined position with respect to the emitter frame; and a processor configured to control the motor to execute a cleaning process by moving the brush around the emitter frame and to determine the cleaning process is finished when the brush is in the predetermined position.

14. The system as defined in claim 13, wherein the plurality of emitter points are arranged around or adjacent to an inner circumference the emitter frame.

15. The system as defined in claim 13, wherein the motor is configured to cause the brush to clean the emitter point via a gearing system having one or more gears.

16. The system as defined in claim 15, wherein the motor is configured to drive the gearing system to move the brush in either direction.

17. The system as defined in claim 15, further comprising a housing configured to couple the gearing system, the emitter point, the motor, the emitter frame, and the fan.

18. The system as defined in claim 15, wherein the gearing system comprises a first gear and a second gear.

19. The system as defined in claim 13, wherein the emitter point is configured to alternate generating positive ions and negative ions.

* * * * *